(12) United States Patent
Shani et al.

(10) Patent No.: US 10,860,448 B2
(45) Date of Patent: Dec. 8, 2020

(54) DETERMINING A FUNCTIONAL STATE OF A SYSTEM UNDER TEST

(71) Applicant: ENTIT SOFTWARE LLC, Sanford, NC (US)

(72) Inventors: Inbar Shani, Yehud (IL); Eli Mordechai, Yehud (IL); Jonathan Taragin, Yehud (IL); Iris Sasson, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 122 days.

(21) Appl. No.: 16/069,057

(22) PCT Filed: Jan. 13, 2016

(86) PCT No.: PCT/US2016/013229
§ 371 (c)(1),
(2) Date: Jul. 10, 2018

(87) PCT Pub. No.: WO2017/123218
PCT Pub. Date: Jul. 20, 2017

(65) Prior Publication Data
US 2019/0018748 A1    Jan. 17, 2019

(51) Int. Cl.
*G06F 11/00* (2006.01)
*G06F 11/26* (2006.01)
(Continued)

(52) U.S. Cl.
CPC .......... *G06F 11/26* (2013.01); *G06F 11/3414* (2013.01); *G06F 11/3452* (2013.01); *G06F 11/3495* (2013.01); *G06F 11/3672* (2013.01)

(58) Field of Classification Search
CPC .................................................. G06F 11/3692
See application file for complete search history.

(56) References Cited

U.S. PATENT DOCUMENTS 6,202,036 B1 *  3/2001  Klein ................... G06F 11/3419
                                                       702/178
6,567,767 B1 *  5/2003  Mackey ............... G06F 11/3419
                                                       702/182
(Continued)

FOREIGN PATENT DOCUMENTS

EP        0869433 A2    10/1998

OTHER PUBLICATIONS

International Search Report & Written Opinion received in PCT Application No. PCT/US2016/013229, dated Sep. 23, 2016, 16 pages.

(Continued)

*Primary Examiner* — Jonathan D Gibson

(57) ABSTRACT

Example implementations relate to determining a functional state of a system under test. For example, a system to determine a functional state of a system under test may include a system controller to execute a functional test of the system under test by invoking a subset of a plurality of functional agents to interact with the system under test. Further, the system may include an agent repository to interact with the system controller and store the plurality of functional agents. Also, the system may include a state module to determine a functional state for the system under test by querying each of the subset of functional agents and comparing aggregated results from the subset of functional agents against defined for the system under test.

15 Claims, 3 Drawing Sheets

(51) Int. Cl.
*G06F 11/34* (2006.01)
*G06F 11/36* (2006.01)

(56) References Cited

U.S. PATENT DOCUMENTS

| | | | | |
|---|---|---|---|---|
| 6,775,644 | B2* | 8/2004 | Myers | G06F 11/3414 702/186 |
| 7,260,503 | B2* | 8/2007 | Stobie | G06F 11/3688 702/183 |
| 7,539,980 | B1* | 5/2009 | Bailey | G06F 11/3688 703/22 |
| 7,721,154 | B1* | 5/2010 | Jaamour | G06F 11/3624 714/38.14 |
| 7,793,157 | B2* | 9/2010 | Bailey | H04L 41/145 714/38.11 |
| 7,950,004 | B2* | 5/2011 | Vieira | G06F 11/3688 714/25 |
| 8,291,387 | B2* | 10/2012 | Pal | G06F 11/3664 717/126 |
| 9,015,668 | B1* | 4/2015 | Michelsen | G06F 11/3688 717/120 |
| 9,064,054 | B2* | 6/2015 | Locker | G06F 11/3688 |
| 9,396,094 | B2* | 7/2016 | Browne | G06F 11/3676 |
| 10,296,449 | B2* | 5/2019 | Sabag | G06F 11/3688 |
| 2003/0208542 | A1* | 11/2003 | Deming | G06F 11/26 709/205 |
| 2011/0022899 | A1* | 1/2011 | Greenberg | G06F 11/3414 714/32 |
| 2013/0024842 | A1* | 1/2013 | Browne | G06F 11/3676 717/125 |
| 2013/0067298 | A1* | 3/2013 | Li | G06F 11/3672 714/799 |
| 2014/0282434 | A1* | 9/2014 | Eilam | G06F 11/3664 717/131 |
| 2015/0205709 | A1 | 7/2015 | Michelsen et al. | |
| 2016/0055077 | A1* | 2/2016 | Baloch | G06F 11/3684 714/38.1 |

OTHER PUBLICATIONS

Unknown, Pre-production Testing: Best Practices & Guidance, Apr. 15, 2009, Retrieved from the Internet: <http://www.rgoarchitects.com/Files/TestingGuidelines.pdf> [retrieved on Oct. 29, 2015], 25 pages.

Douglas, Scott A.; "Autonomous Agents in Complex Event-Driven Software Systems"; 20th Annual IEEE International Conference and Workshops on the Engineering of Computer Based Systems (ECBS), 978-0-7695-4991-0 2013; DOI 10.1109/ECBS.2013.35; 1023, Published 2013, 1 page.

Maddox; Philip; acmqueue, Distributed Development; "Testing a Distributed System"; 2015, ACM copy write; 6 pp.

Zopkio; "Distributed performance and functional test framework" Python documentation; https://zopkio.readthedocs.io/en/latest/; downloaded Mar. 4, 2020; 7 pp.

* cited by examiner

DETERMINING A FUNCTIONAL STATE OF A SYSTEM UNDER TEST

BACKGROUND

Computing systems may serve a plurality of input source and output channels. Functional correctness, referring to a determination of whether the computing system and/or instructions perform as expected, may not be limited to a single user experience. Such computing systems may be verified with a plurality of users behaving in various manners, and in various environments.

DETAILED DESCRIPTION

Figure 1:
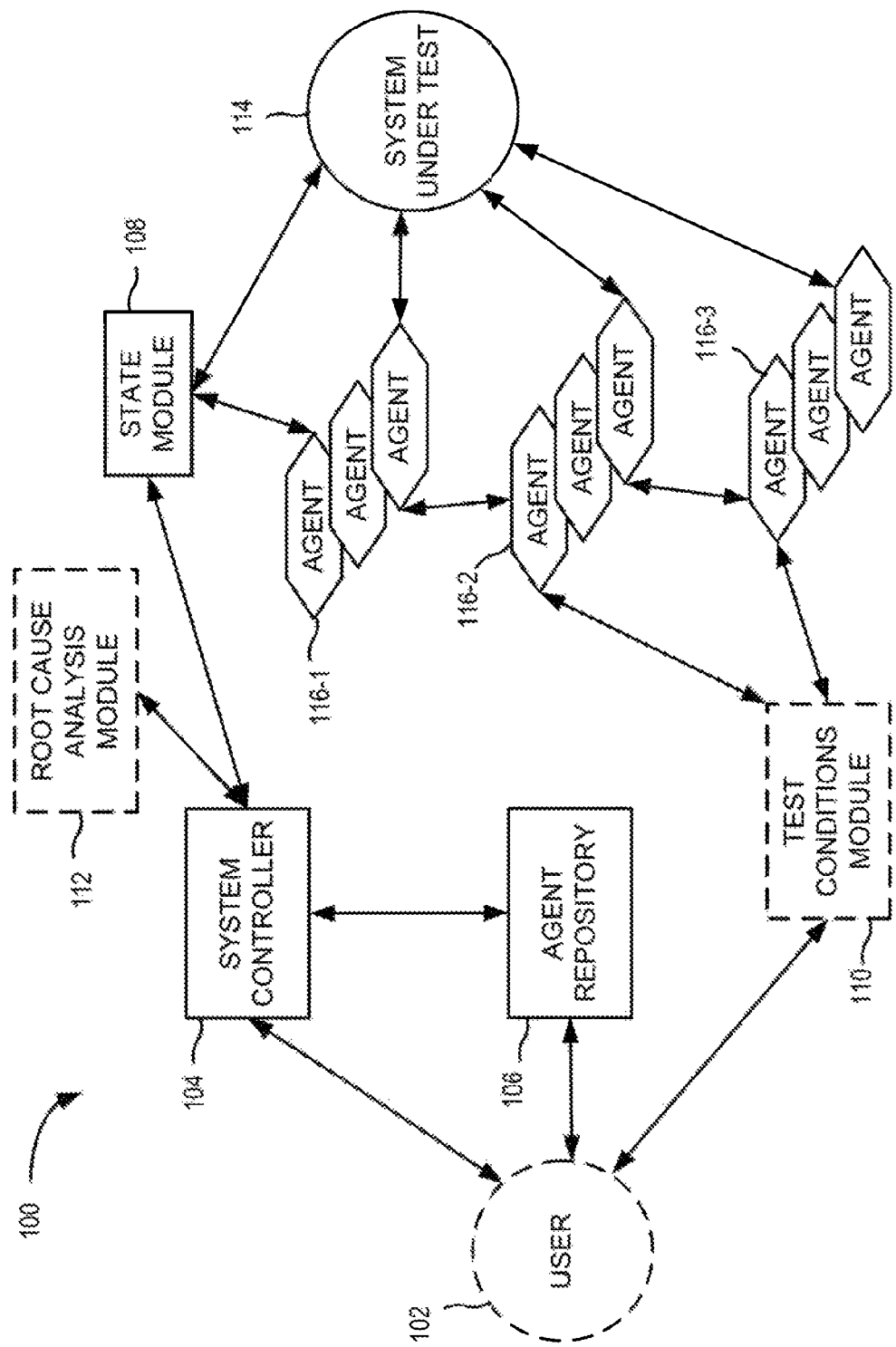
FIG. 1 is a block diagram of an example system for determining a functional state of a system under test consistent with the present disclosure.

Modern computing systems and applications may adopt technologies that shift from a symmetric user experience to a varying user experience. As used herein, a symmetric user experience refers to an output that is the same for all users of the system, whereas a varying user experience refers to an output that may vary from one user to the next. Consider the navigational applications as an example. Navigational applications may provide road navigation services to drivers by tracking global positioning service (GPS) data from mobile devices used by other drivers. Each user of the navigational application may receive different navigation recommendations within the same conditions, as the behavior of other drivers affect traffic and in turn affect the navigational application. The driver may or may not act as recommended by the navigational application, and in doing so may further affect traffic. Such navigational applications may be enhanced with further input sources such as police reports of accidents and roadblocks, and/or traffic volume reports from sensors mounted on traffic lights. These sources may affect and may be affected by the navigational application and may further be constrained by each other.

To test a computing system for functional correctness, all of the varying input and output sources for the system may be simulated. However, applications that rely on a crowd of input sources and output channels and their interconnections may fail to simulate the interaction of a plurality of functional agents and determine a functional state of the system using those functional agents. As used herein, a functional agent refers to instructions to execute a particular configuration of events in the system under test and verify a particular result in the system under test in response to the particular configuration of events. Other approaches to testing computing systems for functional correctness either test for highly granular functions, test a single user experience, or test performance of the system with multiple symmetric users. However, such approaches do not simulate the functioning of the computing system including crowd interaction, allowing a user to control the crowd interaction, create test conditions, capture the system under test behavior and evaluate the system under test behavior. As used herein, a "crowd" refers to a collective group of users of the system, which may be real or simulated users.

In contrast, determining a functional state of a system under test, consistent with the present disclosure, allows for functional testing of an application with a plurality of functional agents. Determining a functional state of a system under test, consistent with the present disclosure, may launch (e.g., execute) a plurality of autonomous functional agents of varying types and behaviors, and define constraints and dependencies on the agents' behavior. Further, determining a functional state of a system under test, consistent with the present disclosure, may allow a user of the system to control the behavior of the system and create particular test conditions, capture system under test output from the agents, determine a functional state for the system under test based on the output from the agents, and compare the captured behavior with expected behavior.

FIG. 1 is a block diagram of an example system 100 for determining a functional state of a system under test consistent with the present disclosure. The system 100 may include a system controller 104, an agent repository 106, and a state module 108. The system 100 may include additional of fewer components than illustrated to perform the various operations as will be described in further detail in connection with FIGS. 2 and 3.

The components of system 100 may include a combination of hardware and programming, but at least hardware, that is configured to perform operations described herein stored in a memory resource (e.g., computer-readable medium, machine-readable medium, etc.) as well as hard-wired program (e.g., logic). For example, the system controller 104 may include hardware and/or a combination of hardware and programming, but at least hardware, to execute a functional test of the system under test 114 by invoking a subset of a plurality of functional agents 116-1, 116-2, 116-3 (collectively referred to herein as functional agents 116) to interact with the system under test 114. For instance, the system controller 104 may invoke only agents 116-1, and not agents 116-2 or 116-3, among other examples. As described herein, a functional agent refers to instructions to execute a particular configuration of events in the system under test 114 and verify a particular result in the system under test 114 in response to the particular configuration of events.

In some examples, the system controller 104 may receive a functional load scenario from a user 102 and select the subset of functional agents from the plurality of functional agents 116 to execute the functional test, based on the received functional load scenario. As used herein, a functional load scenario refers to a plurality of conditions which define the functional test and limit actions performed by the subset of functional agents. For instance, the system controller 104 may provide the user 102 with a control dashboard or console and settings such as system under test interface points, a test scenario, and/or report options, and the user 102 may specify a functional load scenario. For example, the user 102 may define a particular weather condition that should be simulated in a navigational application, and/or particular volumes of traffic to simulate in the navigational application, among others. While a navigational application is provided as an example of a system under test, examples are not so limited, and other systems may be tested. As used herein, a functional load scenario refers to a particular set of circumstances under which the function of the system will be tested, which may be specific to the particular system.

Similarly, the system controller 104 may start and/or stop a functional load scenario, capture system under test behavior, as well as define expected system under test behavior in functional load terms. Put another way, the system controller 104 is responsible for, given a functional load scenario start action, launching the distribution of selected functional agents 116, controlling various factors relating to the interoperation of the functional agents 116, querying the functional agents 116 and system under test 114 to capture the state of the system under test 114. As used herein, the state the system under test refers to a level of functioning defined relative to the desired function of the system under test. The state of the system under test may be "pass" indicating that the system is performing at a level above a threshold level of performance, or "fail" indicating that the system is performing at a level below the threshold level of performance. However, examples are not so limited, and the state of the system may be represented by a numerical value, a color, or other indication such that the functional performance of the system under test may be compared against expected performance measurements. As used herein, an expected performance measurement may refer to a predefined level of performance for the system under test 114. As such, the system controller 104 may define expected system under test 114 behavior in terms of statistical values of functional behavior for comparison by the state module 108.

Further, the agent repository 106 may include hardware and/or a combination of hardware and programming, but at least hardware, to interact with the system controller 105 and store the plurality of functional agents 116. For example, the system 100 may have built-in categories of autonomous agents to simulate various types of users, sensors such as traffic sensors, and/or various environmental conditions, among other examples. The user 102 may select a distribution of agents, such as agents 16-1, and initiate conditions associated with these agents. Put another way, by receiving a selection of agents 116-1, the system 100 may initiate a functional script representing the selected agents 116-1, execute the selected agents, and view and control their continued behavior. For instance, the user 102 may change a factor in the behavior of the selected agents 116-1.

The state module 108 may include hardware and/or a combination of hardware and programming, but at least hardware, to determine a functional state for the system under test 114 by querying each of the subset of functional agents 116 and comparing aggregated results from the subset of functional agents 116 against defined metrics for the system under test 114. For instance, the state module 108 may be activated by the system controller 104 to capture the system under test state by querying the running agents for input and/or output to and/or from the system under test 114. The state module 108 may aggregate the results received from the plurality of functional agents 116, and compound the results with metrics captured directly from the system under test 114 via its published interfaces. Put another way, the state module 108 may combine the results from all of the functional agents 116 (which may only be a subset, such as 116-2), with metrics captured from the system under test 114, and determine the state of the system under test 114 from the combined information.

The state module 108 may also enable a user (e.g., 102) to define expected system under test states and/or behavior in statistical or probability terms. For instance, the user 102 may define that a certain percentage of all routes generated by a navigational application will match a particular route driven by one of the functional agents. The state module 108 may also capture specific system under test events and/or functional agent events, such as specific events that indicate that the system under teat 114 has failed. In some examples, the system controller 104 may receive the determined functional state from the state module 108, and display a functional load scenario associated with the functional test and the determined functional state on a user interface.

In some examples, the system 100 may include a root cause analysis module 112. The root cause analysis module 112 may include hardware and/or a combination of hardware and programming, but at least hardware, to determine a cause of a failure of the functional test based on the determined functional state. The root cause analysis module 112 may be activated by the system controller 104 and may interact with the system under test state module 108 to track and analyze correlations between functional agents' 116 behavior, the system under test metrics, and test conditions, to a user detect a cause of a success and/or failure of a particular test.

Further, the system 100 may include a test conditions module 110 to enable the user 102 to define and invoke a situation in the functional load scenario. For example, the test conditions module 110 may present the user with the option of specifying that a flood blocked several roads in a navigational application, among other examples. Similarly, the test conditions module 110 may present the user 102 with the expected system under test 114 behavior, such as, the navigational application recommends that users of the application avoid the blocked road without creating traffic jams on alternate roadways. The test conditions module 110 may interacts with the functional agents 116 based on their defined interconnections to simulate the test conditions. The test conditions module 110 may further interact with the system under test state module 108 and the root cause analysis module 112 to produce an actionable report for the user 102 on how the system under test behaved given the test conditions. As used herein, an actionable report refers to a report generated by the test conditions module 110 that may provide recommendations and/or suggested actions to be performed by the user 102.

Figure 2:
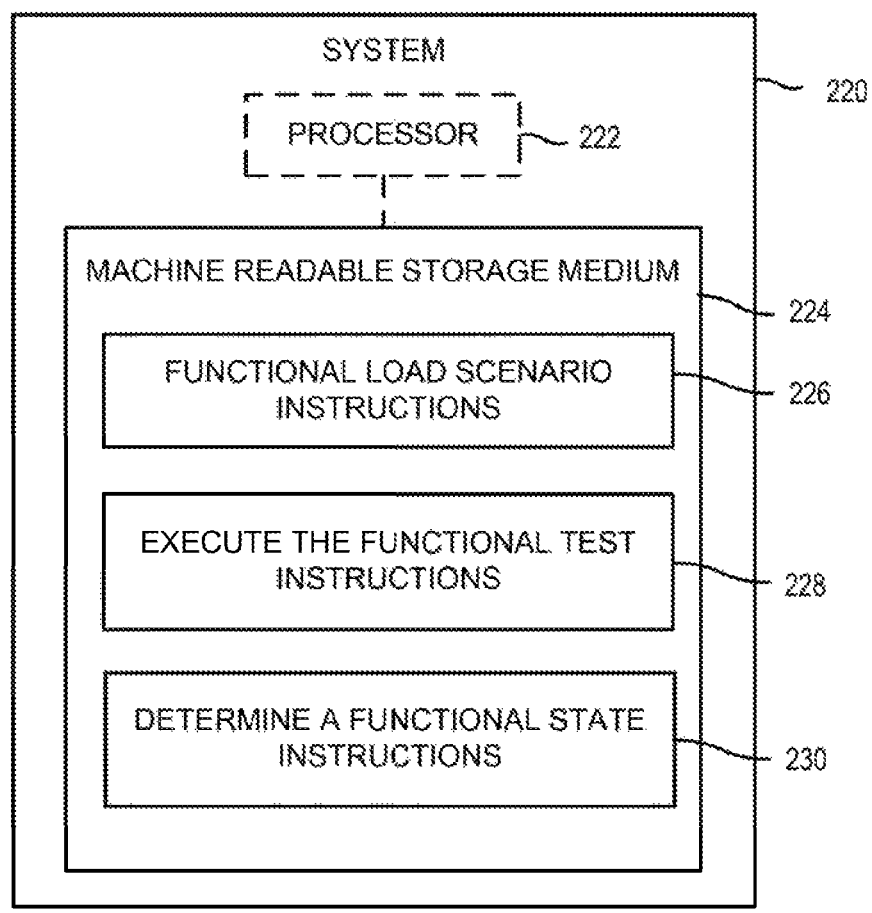
FIG. 2 is a block diagram of an example system for determining a functional state of a system under test, consistent with the present disclosure.

FIG. 2 is a block diagram of an example system 220 for determining a functional state of a system under test, consistent with the present disclosure. System 220 may include a computing device that is capable of communicating with a remote system. In the example of FIG. 2, system 220 includes a processor 222 and a machine-readable storage medium 224. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed) across multiple processors.

Processor 222 may be a central processing unit (CPU), microprocessor, and/or other hardware device suitable for retrieval and execution of instructions stored in machine-readable storage medium 224. In the particular example shown in FIG. 2, processor 222 may receive, determine, and send instructions 226, 228, 230 for determining a functional state of a system under test. As an alternative or in addition to retrieving and executing instructions, processor 222 may include an electronic circuit comprising a number of electronic components for performing the operations of the instructions in machine-readable storage medium 224. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 224 may be any electronic, magnetic, optical, or other physical storage device that stores executable instructions. Thus, machine-readable storage medium 224 may be, for example, Random Access Memory (RAM), an Electrically-Erasable Programmable Read-Only Memory (EEPROM), a storage drive, an optical disc, and the like. Machine-readable storage medium 224 may be disposed within system 220, as shown in FIG. 2. In this situation, the executable instructions may be "installed" on the system 220. Machine-readable storage medium 224 may be a portable, external or remote storage medium, for example, that allows system 220 to download the instructions from the portable/external/remote storage medium. In this situation, the executable instructions may be part of an "installation package". As described herein, machine-readable storage medium 224 may be encoded with executable instructions for determining a functional state of a system under test.

Referring to FIG. 2, functional load scenario instructions 226, when executed by a processor (e.g., 222), may cause system 220 to receive a functional load scenario from a user of a system under test, where the functional load scenario defines conditions under which a functional test of the system under test will be performed. For example, as discussed in relation to FIG. 1, the system controller may provide the user with a control dashboard and/or console and settings for defining a particular functional load scenario. The user may be presented with options such as system under test interface points, a test scenario, and/or report options. In some examples, the user may create the functional load scenario on his or her own without a particular template provided by the system 220.

Execute the functional test instructions 228, when executed by a processor (e.g., 222), may cause system 220 to execute the functional test with a system controller by invoking a subset of a plurality of functional agents. As described herein, a functional agent includes instructions to execute a particular configuration of events in the system under test and verify a particular result in the system under test in response to the particular configuration of events. Put another way, the system 200 may execute a subset of a plurality of functional agents, where the agents collectively simulate a particular condition and/or series of events within the system under test. As described herein, the functional agents may be associated with an expected outcome, or expected function, by the system under test.

Determine a functional state instructions 230, when executed by a processor (e.g., 222), may cause system 220 to determine a functional state for the system under test by querying each of the subset of functional agents and comparing aggregated results from the subset of functional agents against defined metrics for the system under test. For example, as discussed in relation to FIG. 1, the state module 108 may query each of the running functional agents (e.g., agents 116). Based on the aggregated results from each of the functional agents running, the state of the system under test may be determined.

In some examples, the system 220 may further include instructions executable by the processor 222 to receive the functional load scenario from the user and automatically select the subset of functional agents using the system controller, based on the functional load scenario.

In some examples, the system 220 may further include instructions executable by the processor 222 to cause the processor 222 to monitor correlations between the subset of functional agents, the aggregated results, and the defined metrics, and perform a root cause analysis to determine a cause of a failure of the functional test, using the monitored correlations. For example, as discussed in relation to FIG. 1, the root cause analysis module (e.g., 112) may compare all of the data collected by the system to determine a cause of a failure and/or a success of a particular functional load scenario.

Also, in some examples, the system 220 may further include instructions executable by the processor 222 to cause the processor 222 to simulate test conditions of the system under test using the subset of functional agents, and query functional behavior of the functional agents during simulation. For example, the processor 222 may execute instructions to send a query to each of the agents, requesting data collected relating to the performance of the executed functional load scenario. The functional state of the system under test may be determined based on the queried functional behavior received from the functional agents.

In some examples, the system 220 may further include instructions executable by the processor 222 to cause the processor 222 to define constraints and dependencies among the subset of functional agents based on the received functional load scenario. For example, if a functional load scenario is that a particular highway is inaccessible due to an accident, each of the functional agents may be defined to depend on one another, and may be modified to collectively simulate the scenario of the inaccessible highway.

Figure 3:
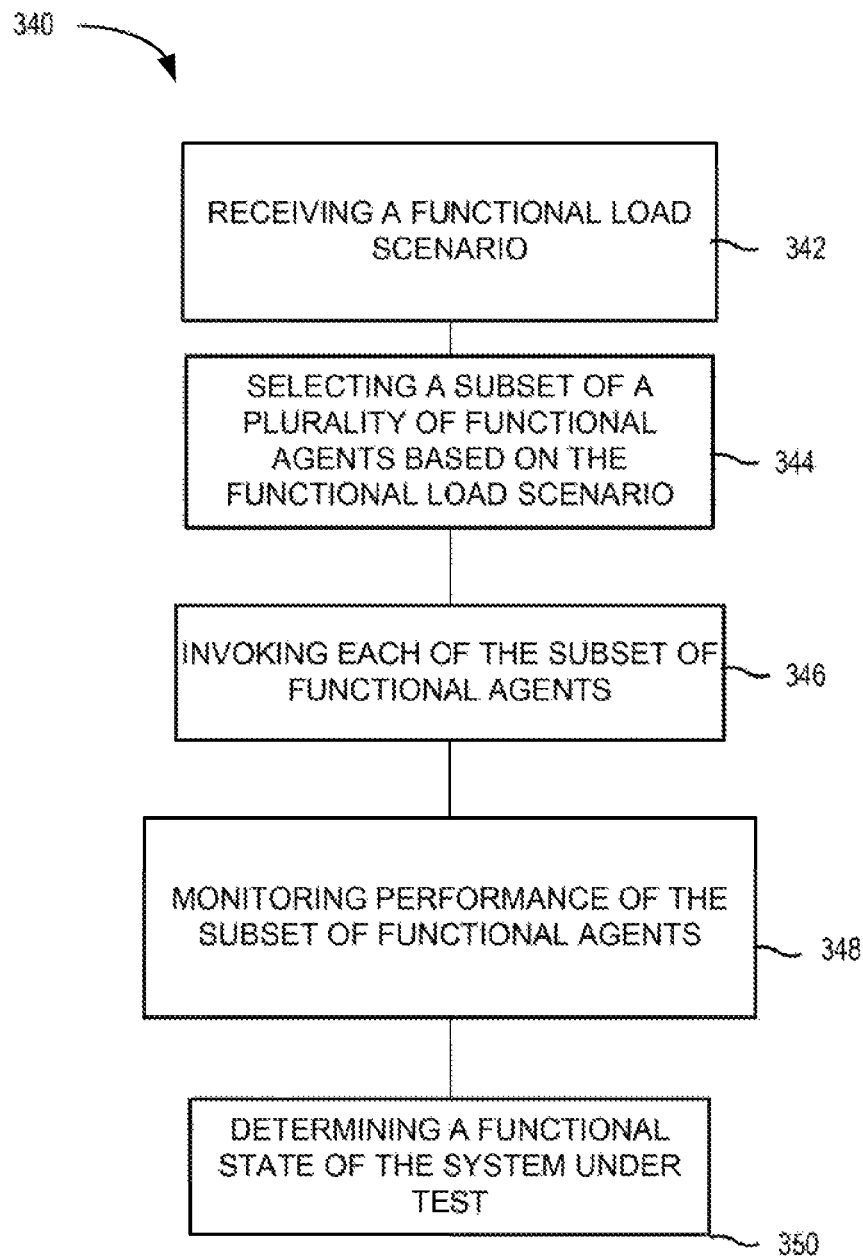
FIG. 3 illustrates an example method for determining a functional state of a system under test, consistent with the present disclosure.

FIG. 3 illustrates an example method 340 for determining a functional state of a system under test, consistent with the present disclosure. While not illustrated in FIG. 3, the method 340 may begin when a user, such as user 102 illustrated in FIG. 1, initiates the system (e.g., system 100 and system 220) and sets the system up for a functional load test. That is, the user may defines the system under test interfaces, select the functional agent distribution and configure the agent types. Put another way, the user may specify the type and number of functional agents that may be used during the functional load scenario, and provide scripts for each of the autonomous agents. As described herein, the user may also establish constraints and dependencies among agents, and define the system under test environment.

At 342, the method 340 may include receiving from a user, a functional load scenario defining conditions under which the functional test of the system under test will be executed. As described above, the user may start the functional load scenario, and the system controller may invoke the functional agents. The functional agents may then begin interacting with the system under test (e.g., system under test 114 illustrated in FIG. 1). Notably, the functional agents may be initiated, or "ramped up" in a variety of ways. For instance, the functional agents may gradually begin operating (e.g., in series), and/or the functional agents may all begin operating at once. Examples are not so limited, and the functional agents may be initiated in other manners other than those described herein.

At 344, the method 340 may include selecting a subset of a plurality of functional agents to execute the functional test based on the functional load scenario. In some examples, a plurality of functional agents (e.g., 116 illustrated in FIG. 1) may be pre-configured, or pre-established by the system. In such instances, a subset of the functional agents may be selected to execute the particular functional test.

At 346, the method 340 may include invoking each of the subset of functional agents to execute the functional test. Once system controller indicates that the system has initiated all of the functional agents, a user may access the test conditions module and define and/or start a test condition, as described in relation to FIGS. 1 and 2. Invoking each of the subset of functional agents may include invoking the conditions defining the functional load scenario, using the subset of functional agents. For instance, the system controller and the test condition module may affect the functional agents to simulate the test conditions. Similarly, the system controller may invoke the system under test state module and root cause analysis module to track the system under test and/or agents behavior, as described herein, and compare the tracked behavior to expected system under test behavior.

At 348, the method 340 may include monitoring the performance of the subset of functional agents. For instance, the system controller may query the functional behavior of the subset of functional agents. The system controller may receive reports from all of the other modules in the system, such as the root cause analysis module, the state module, and the test conditions module, and provide the user with a dynamic, up-to-date view of agents summary, test conditions in effect, system under test behavior versus expected behavior, and the root use analysis.

At 350, the method 340 may include determining a functional state of the system under test by comparing the queued functional behavior against defined metrics for the system under test. As described herein, determining the functional state of the system under test may include querying each of the subset of functional agents, aggregating results from the queries, and comparing the aggregated results against the defined metrics for the system under test. Similarly, determining the functional state of the system under test may include determining that the queried functional behavior of the system under test is below a threshold level of functional behavior, based on the defined metrics, and determining that the functional test has failed in response to the determined functional behavior.

In some examples, the method 340 may include sending instructions to the subset of functional agents to terminate the functional test and reporting the queried functional behavior and determined functional state on a user interface in response to the terminated functional test. For instance, once a user is satisfied that the test conditions have been verified, the user may instruct the system controller to stop the functional load scenario, at which point the system controller may notify the functional agents of the termination, and report the collected metrics from the different modules.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuit (ASICs), etc., as opposed to computer executable instructions, e.g., software firmware, etc., stored in memory and executable by a processor.

What is claimed:

1. An apparatus comprising:
   a processor; and
   a memory to store instructions that, when executed by the processor, cause the processor to:
   execute a functional test of a system under test, wherein:
   the system under test is associated with an application,
   executing the functional test comprises invoking a subset of functional agents of a plurality of functional agents to interact with the system under test to collectively perform the functional test based on a first input defining relationships among the subset of functional agents,
   the relationships are expected to cause the application to exhibit a predetermined expected behavior, and
   the relationships represent at least one of a condition for the application or a series of events for the application; and
   determine a functional state for the system under test by querying each functional agent of the subset of functional agents and comparing aggregated results from the subset of functional agents against defined metrics for the system under test, wherein the defined metrics correspond to the predetermined expected behavior.

2. The apparatus of claim 1, wherein the relationships represent the series of events, and the instructions, when executed by the processor, further cause the processor to:
   receive a second input representing a user selection of a functional load scenario and select the subset of functional agents from the plurality of functional agents to execute the functional test, based on the functional load scenario.

3. The apparatus of claim 1, wherein the instructions, when executed by the processor, further cause the processor to define the predetermined expected behavior in terms of statistical values of a functional behavior.

4. The apparatus of claim 1, wherein the instructions, when executed by the processor, further cause the processor to:
   receive data representing the functional state; and
   provide data to display a functional load scenario associated with the functional test and the functional state on a user interface.

5. The apparatus of claim 1, wherein the relationships represent a plurality of conditions which define the functional test and limit actions performed by the subset of functional agents.

6. The apparatus of claim 1, wherein the instructions, when executed by the processor, further cause the processor to determine a cause of a failure of the functional test based on the functional state.

7. A non-transitory machine-readable storage medium storing instructions executable by a processor to cause the processor to:
   receive a user selection of a functional load scenario for a system under test and an input defining relationships, among a subset of functional agents of a plurality of functional agents, wherein the relationships represent at least one of a condition for an application or a series of events for the application, the relationships are expected to cause the application to exhibit a predetermined expected behavior, the system under test is associated with the application, and the functional load scenario defines conditions under which a functional test of the system under test will be performed;
   execute the functional test with a system controller, wherein executing the functional test comprises invoking the subset of functional agents to interact with the system under test to collectively perform the functional test; and
   determine a functional state for the system under test, wherein determining the functional state comprises querying each functional agent of the subset of functional agents and comparing aggregated results from the subset of functional agents against defined metrics for the system under test, wherein the defined metrics correspond to the predetermined expected behavior.

8. The storage medium of claim 7, wherein the instructions, when executed by the processor, further cause the processor to:
   automatically select the subset of functional agents using the system controller, based on the functional load scenario.

9. The storage medium of claim 7, wherein the instructions, when executed by the processor, further cause the processor to:
   monitor correlations between the subset of functional agents, the aggregated results, and the defined metrics; and
   perform a root cause analysis to determine a cause of a failure of the functional test, using the correlations.

10. The storage medium of claim 7, wherein the instructions, when executed by the processor, further cause the processor to:
    simulate test conditions of the system under test using the subset of functional agents; and
    query functional behavior of the functional agents during the simulation, wherein the functional state is determined based on the functional behavior.

11. The storage medium of claim 7, wherein the instructions, when executed by the processor, further cause the processor to:
    define constraints and dependencies among the subset of functional agents based on relationships.

12. A method comprising:
    receiving input representing a user selection of a functional load scenario for a system under test and representing a user selection of relationships among a subset of functional agents of a plurality of functional agents, wherein the relationships represent at least one of a condition for an application or a series of events for the application, the system under test is associated with the application, the relationships are expected to cause the application to exhibit a predetermined expected behavior, and the functional load scenario defines conditions under which a functional test of the system under test will be performed;
    selecting the subset of functional agents to execute the functional test and constraining the subset of functional agents based on the relationships;
    executing the functional test, wherein executing the functional test comprises invoking the subset of functional agents to interact with the system under test to collectively perform the functional test;
    querying a functional behavior of the subset of functional agents; and
    determining a functional state of the system under test, wherein the determining comprises comparing the functional behavior against defined metrics for the system under test, wherein the defined metrics correspond to the predetermined expected behavior.

13. The method of claim 12, wherein the comparing comprises:
    querying each functional agent of the subset of functional agents to provide a plurality of results;
    aggregating the plurality of results to provide aggregated results; and
    comparing the aggregated results against the defined metrics.

14. The method of claim 12, wherein the determining comprises:
    determining that the functional behavior is below a threshold level of functional behavior, based on the defined metrics; and
    determining that the functional test has failed in response to the determination that the functional behavior is below the threshold level.

15. The method of claim 12, further comprising:
    sending instructions to the subset of functional agents to terminate the functional test; and
    providing data to report the functional behavior and the functional state on a user interface in response to the termination.

* * * * *